March 5, 1957 P. DE ORMAETXEA ET AL 2,784,045
FILING CABINETS
Filed June 3, 1952 12 Sheets-Sheet 1
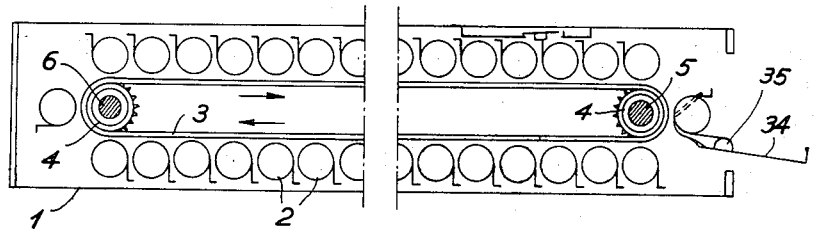
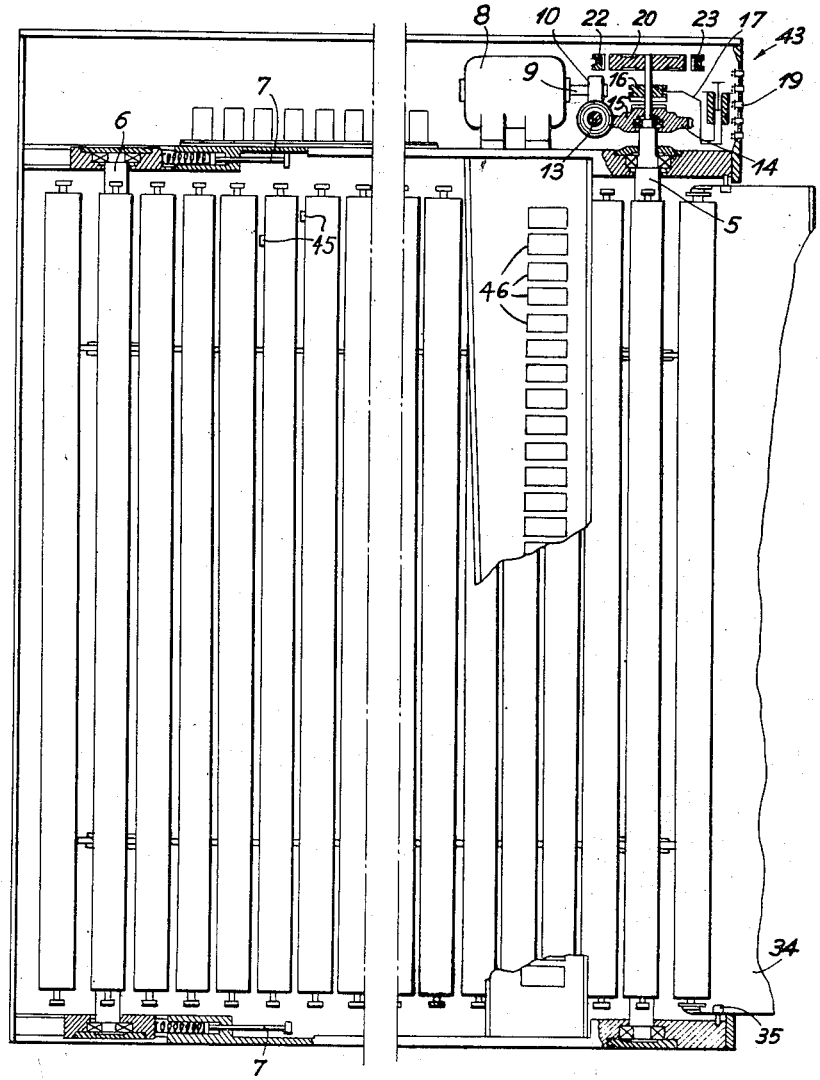

March 5, 1957   P. DE ORMAETXEA ET AL   2,784,045
FILING CABINETS
Filed June 3, 1952   12 Sheets-Sheet 2
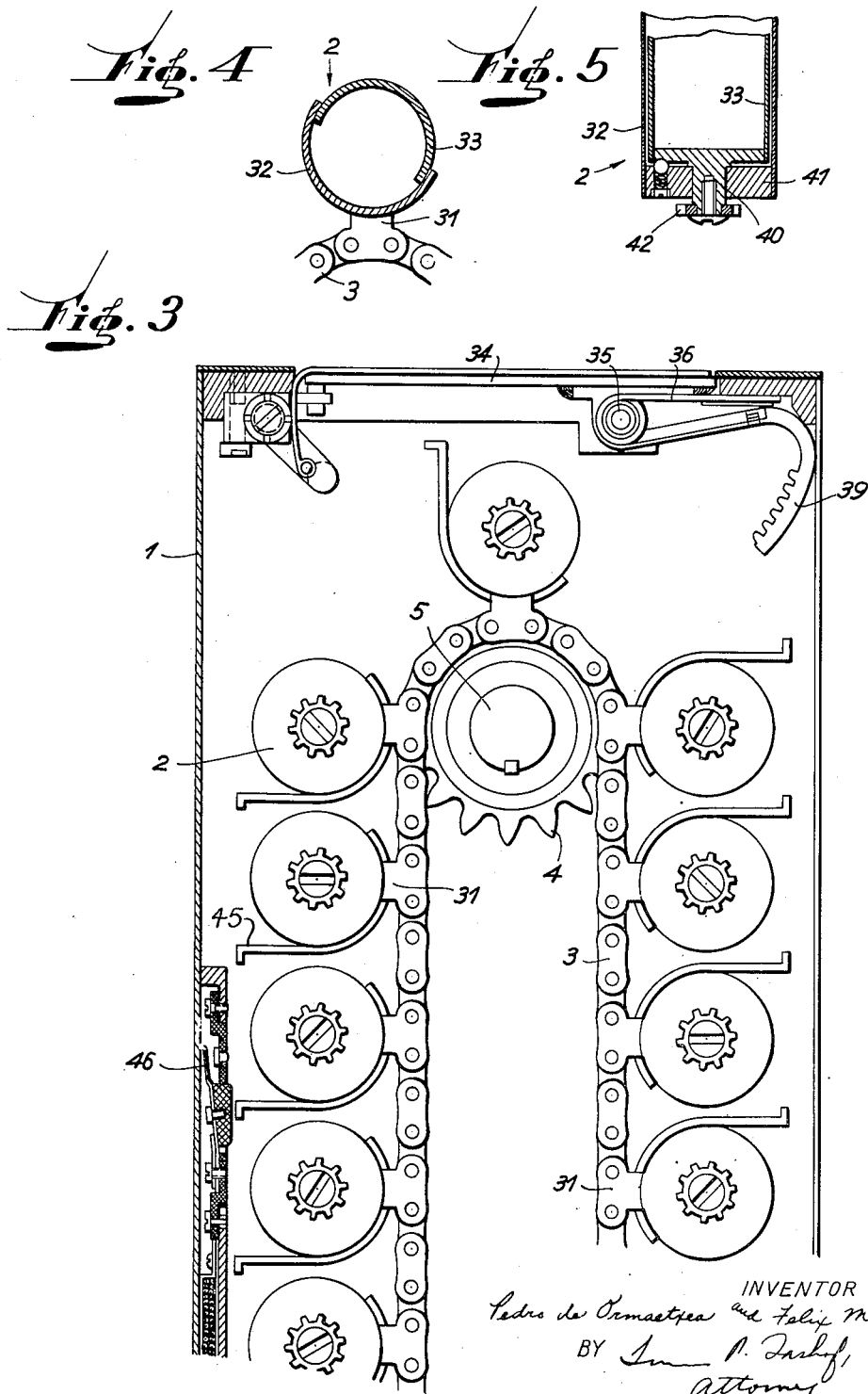

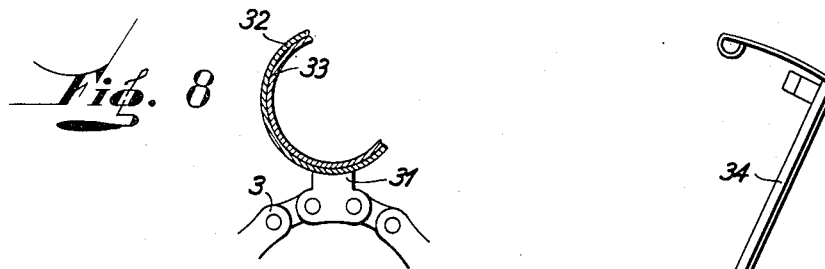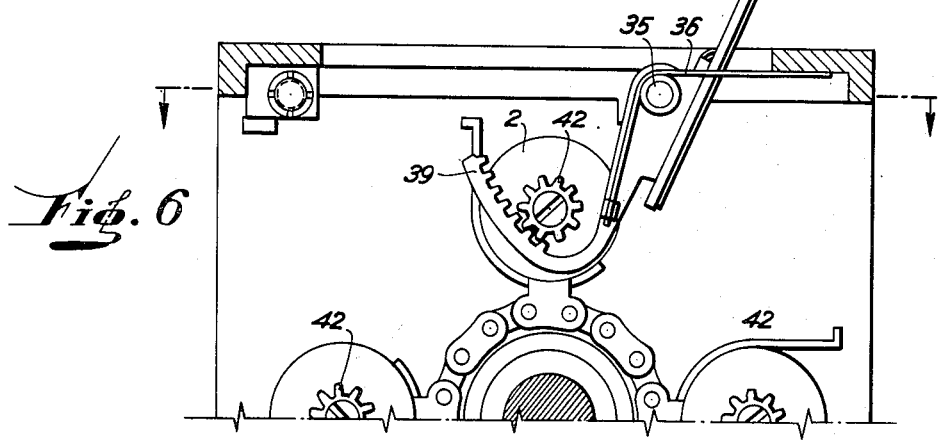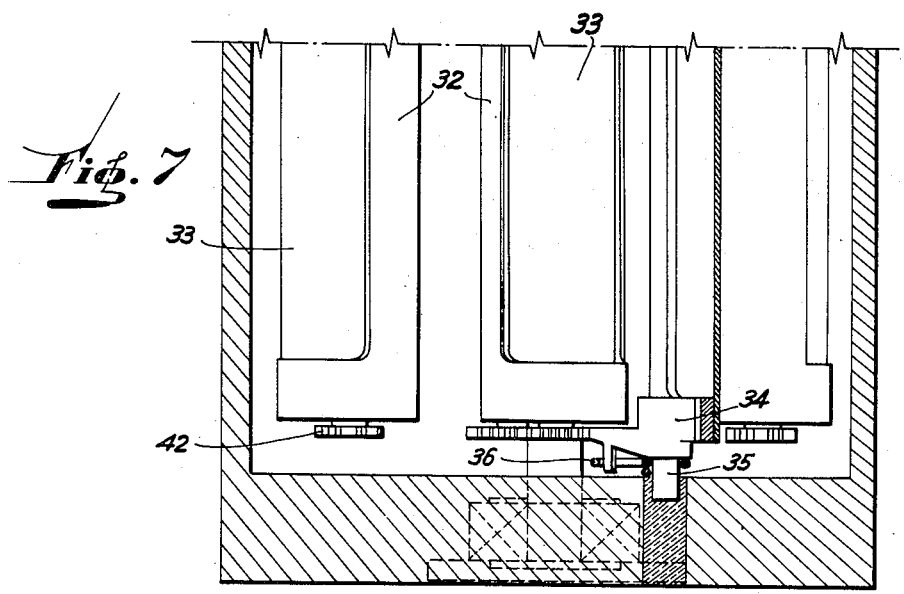

March 5, 1957  P. DE ORMAETXEA ET AL  2,784,045
FILING CABINETS
Filed June 3, 1952  12 Sheets-Sheet 4

INVENTOR
Pedro de Ormaetxea and Felix Miñoa
BY
Attorney

March 5, 1957  P. DE ORMAETXEA ET AL  2,784,045
FILING CABINETS
Filed June 3, 1952  12 Sheets-Sheet 7

INVENTOR
Pedro de Ormaetxea and Felix Mason
BY
Attorney

March 5, 1957 P. DE ORMAETXEA ET AL 2,784,045
FILING CABINETS
Filed June 3, 1952 12 Sheets-Sheet 8
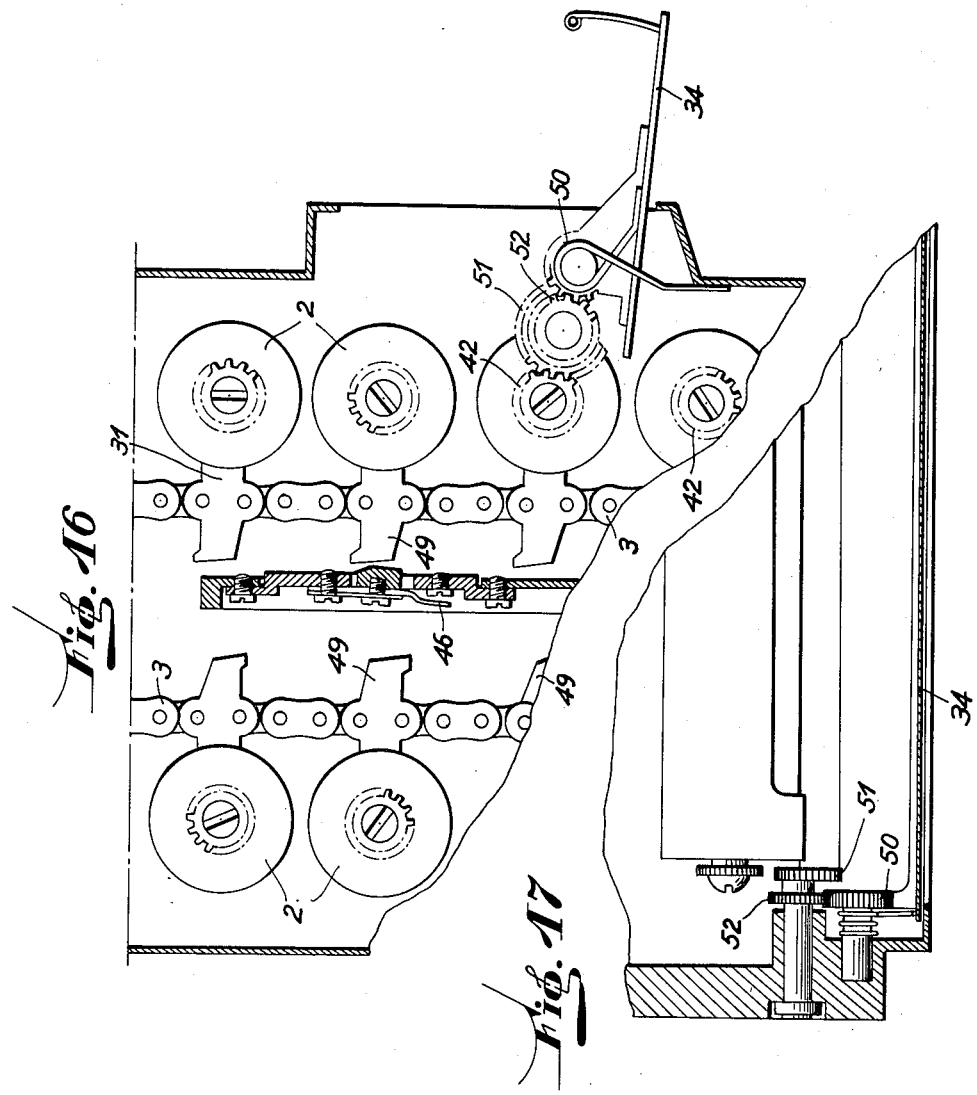
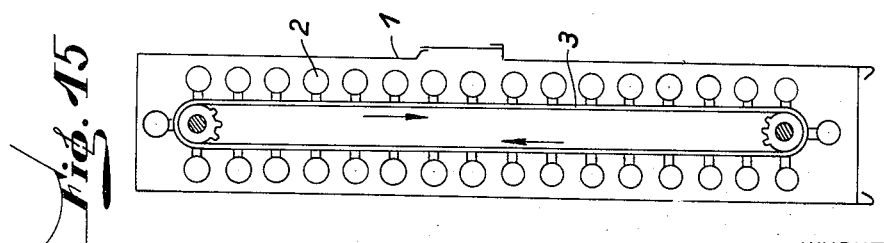

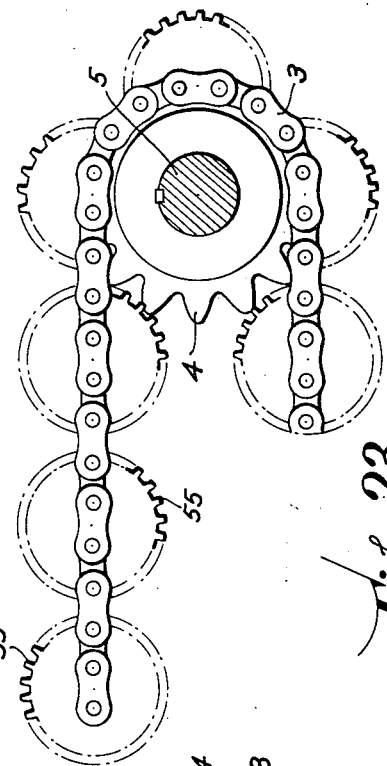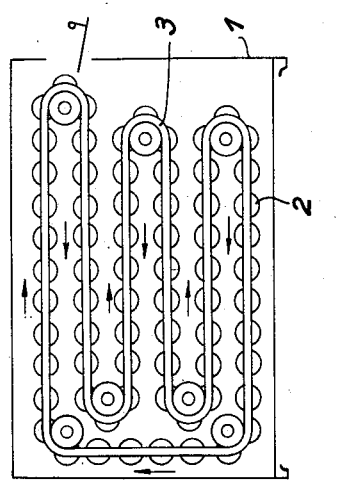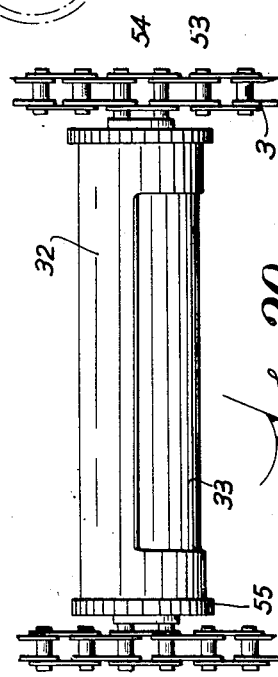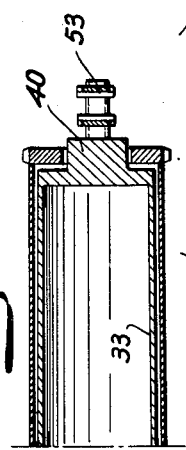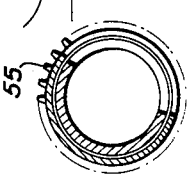

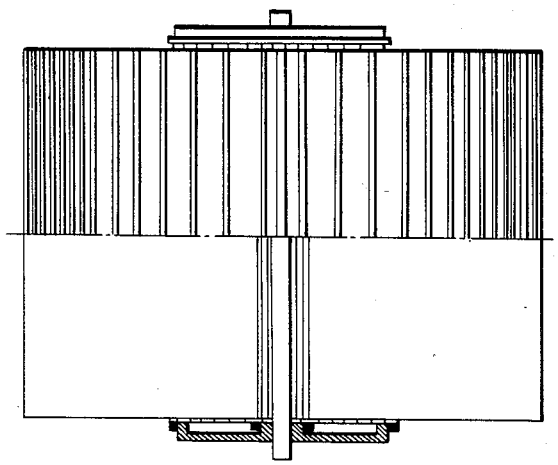
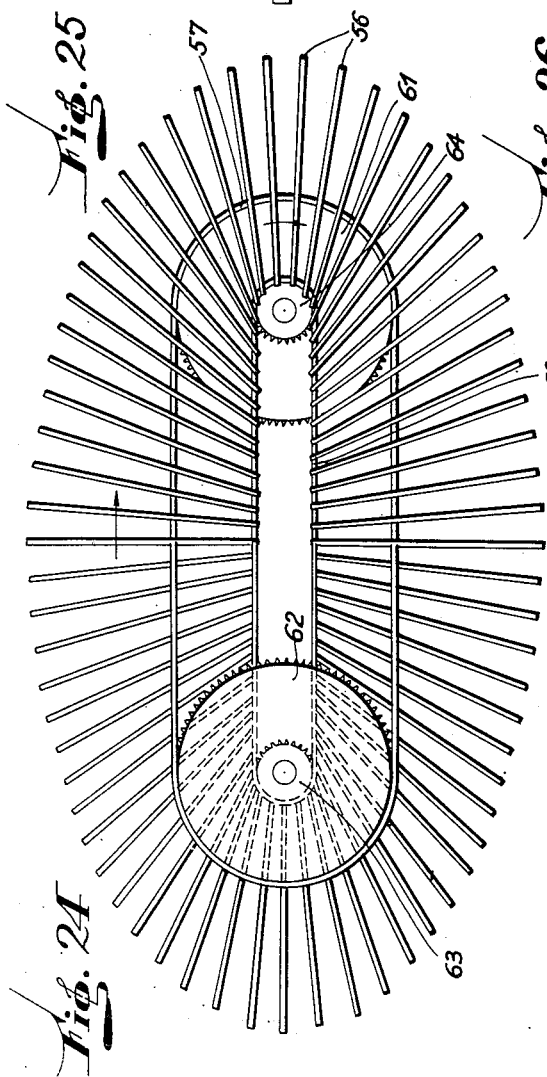
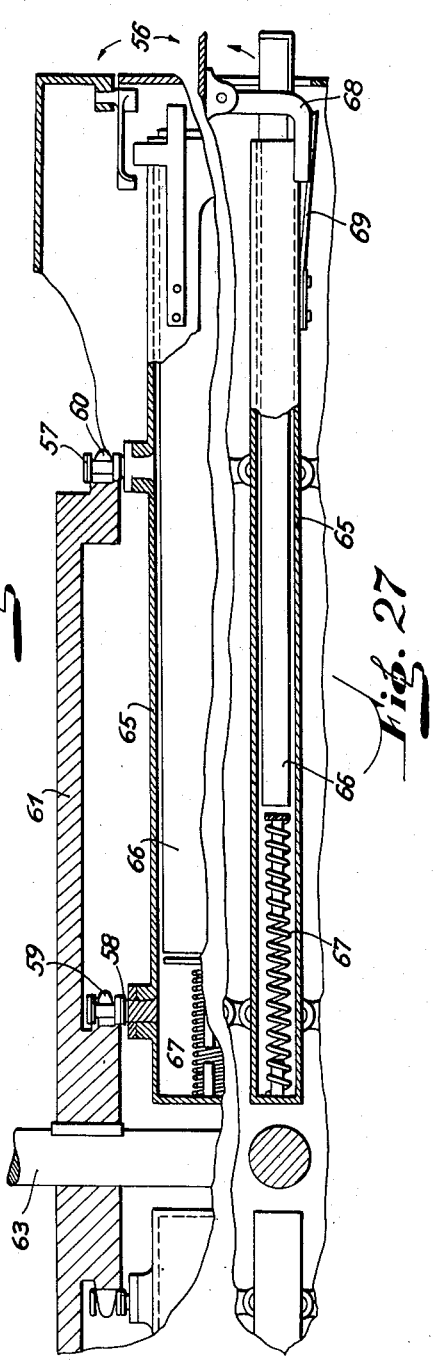

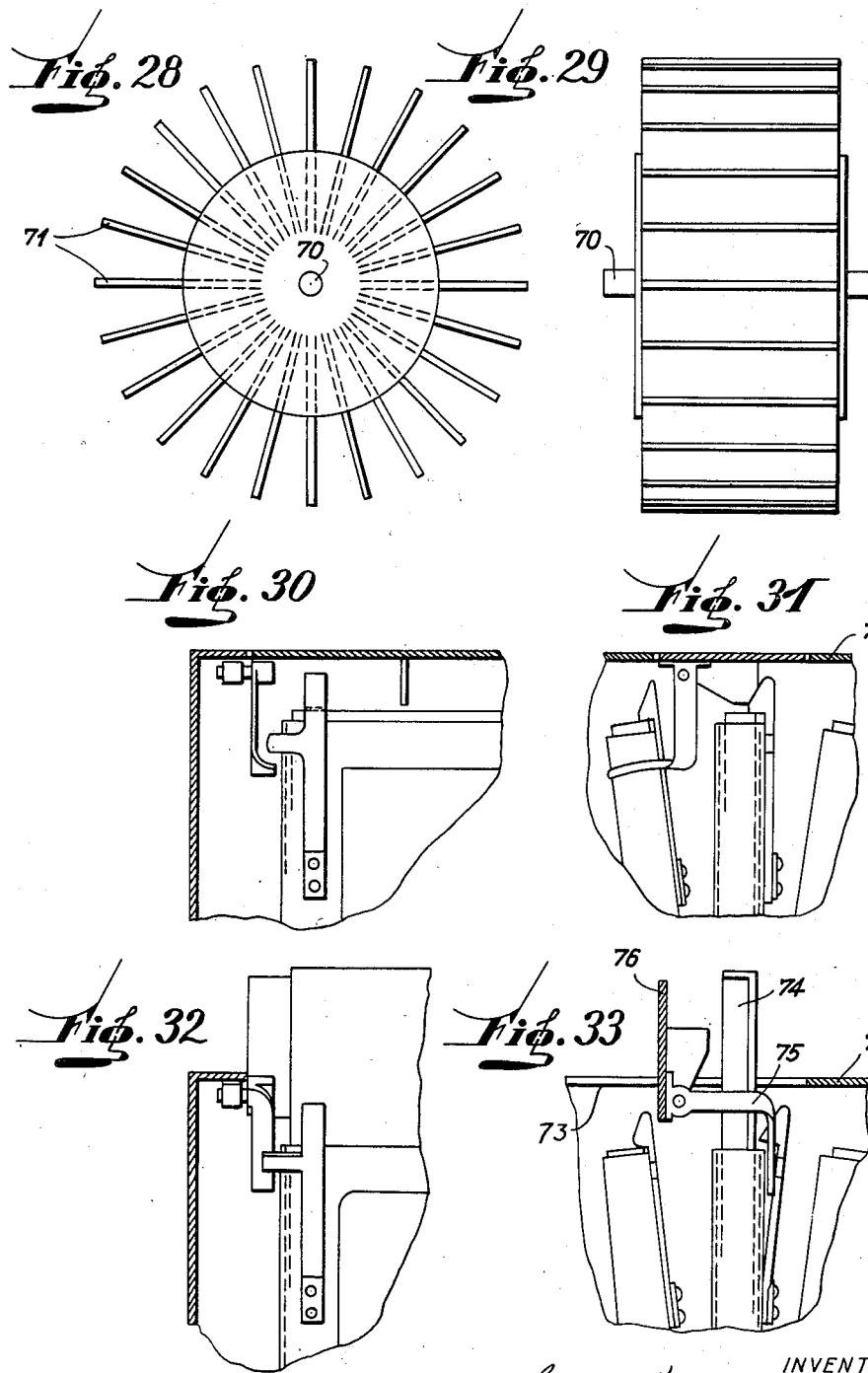

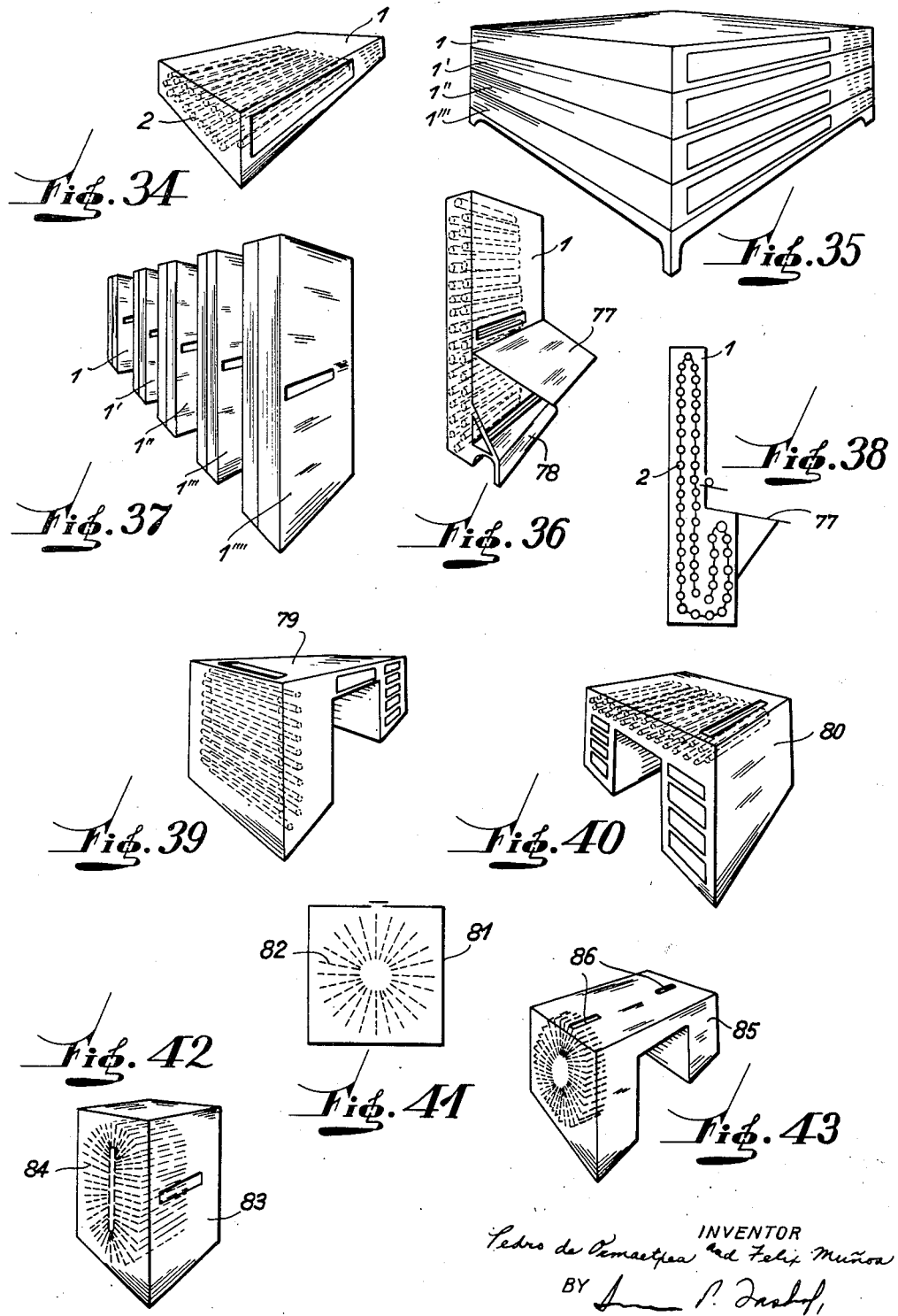

United States Patent Office 2,784,045
Patented Mar. 5, 1957

2,784,045

FILING CABINETS

Pedro de Ormaetxea and Felix Muñoa,
Santa Fe, Argentina

Application June 3, 1952, Serial No. 291,386

10 Claims. (Cl. 312—223)

This invention relates to filing cabinets, and more particularly to a filing cabinet suitable for preserving, properly classified, plans or similar documents.

The filing cabinet of this invention is mainly formed by a box housing therein the receptacles for containing the documents, and mechanisms capable of actuating said receptacles.

The receptacles are constituted by hollow cylinders provided with corresponding access covers and mounted on endless chains meshing on two parallel shafts, one of which is connected through a clutch system to an electric motor capable of causing the rotation of all the receptacles.

The box containing the receptacles is provided with a cover or door affording access to one of the receptacles when the latter is located opposite thereto.

The filing cabinet of this invention is provided with an electric system by means of which the operation of finding the receptacle containing a given plan is carried out rapidly and automatically.

In effect, the pressing of one of a plurality of push-buttons provided in a control panel, will automatically cause the starting of the motor, the actuation of the clutch connecting the latter with the driving shaft of the endless chain on which the receptacles are mounted, the actuation by one of said receptacles of a switch at the time the selected receptacle is positioned opposite the box door, the actuation of an electromagnet controlling a brake mechanism for braking said shaft, the release of the box-door locking means by a bar actuating said clutch, and the opening of the selected receptacle cover by the opening of the box door through the action of a spring.

An advantage of the filing cabinet of this invention resides in the fact that it may be formed by a plurality of units such as the one described above. Such units are superposed and by means of a suitable arrangement of the driving shaft for each unit, said shafts may be coupled to each other so as to take advantage of the force produced by a single motor.

In order that the invention may be more clearly understood and readily carried out, a preferred embodiment thereof has been illustrated by way of example in the accompanying drawings, in which:

Fig. 1 is a schematic longitudinal sectional view of the filing cabinet in accordance with this invention, showing a plurality of receptacles mounted on an endless chain meshing on a pair of shafts. This view shows the box door in fully open position.

Fig. 2 is a plan longitudinal section of the filing cabinet illustrated in Fig. 1, showing the actuating mechanisms thereof.

Fig. 3 is a view showing the manner in which the receptacles are mounted on the endless chain, the particular shape and mounting of the box door and the manner in which the receptacles are arranged for actuating the switches for stopping the machine.

Figs. 4 and 5 illustrate particularly the construction of the receptacles and the corresponding covers therefor.

Fig. 6 is a view showing the manner in which a toothed sector carried by the box door operates when a selected receptacle is positioned opposite thereto.

Fig. 7 is a front view of the filing cabinet showing one of the receptacles in open position and two other receptacles closed.

Fig. 8 is a cross-sectional view of a receptacle, showing the way in which it remains when in open position.

Figs. 15, 16 and 17 show a filing cabinet having a vertical box the mechanism of which is similar to that illustrated in Figs. 1 to 14, excepting the arrangement of the switches and the mechanism for opening the cabinet door, shown in Fig. 16.

Figs. 18 to 23 show a filing cabinet of the type schematically shown in Fig. 23, the actuating mechanism of which are similar to the one described above, excepting the manner of mounting the endless chains on the spur wheels carried by the receptacles, as clearly shown in Figs. 18 and 19.

Fig. 20 is a longitudinal sectional view of a receptacle with a corresponding spur wheel.

Figs. 21 and 22 are views showing the open and closed cross-section of the same receptacle.

Fig. 23 is a schematic side view of the box or cabinet.

Figs. 24 to 27 illustrate a modified embodiment of the filing cabinet, arranged specially for holding folders.

Fig. 24 is a side view of the folder filing cabinet.

Fig. 25 is a front view, partly in section, of the filing cabinet shown in Fig. 24.

Fig. 26 is a view, partly in section, showing the shape of the pinion moving the modified filing cabinet.

Fig. 27 shows a mechanical device for opening each of the folders.

Figs. 28 to 33 illustrate a further embodiment of the filing cabinet, comprising a circular shape folder filing cabinet.

Fig. 28 is a side view of the modified filing cabinet.

Fig. 29 is a front view thereof.

Figs. 30 and 31 are a side view and a front view, respectively, of the filing cabinet in closed position.

Figs. 32 and 33 are similar to Figs. 30 and 31 but showing the filing cabinet in open position.

Figs. 34 to 43 show different types of boxes or cabinets for containing the different types of files shown in Figs. 1 to 33.

The same reference characters are used to indicate like or corresponding parts or elements throughout the drawings.

Figure 9:
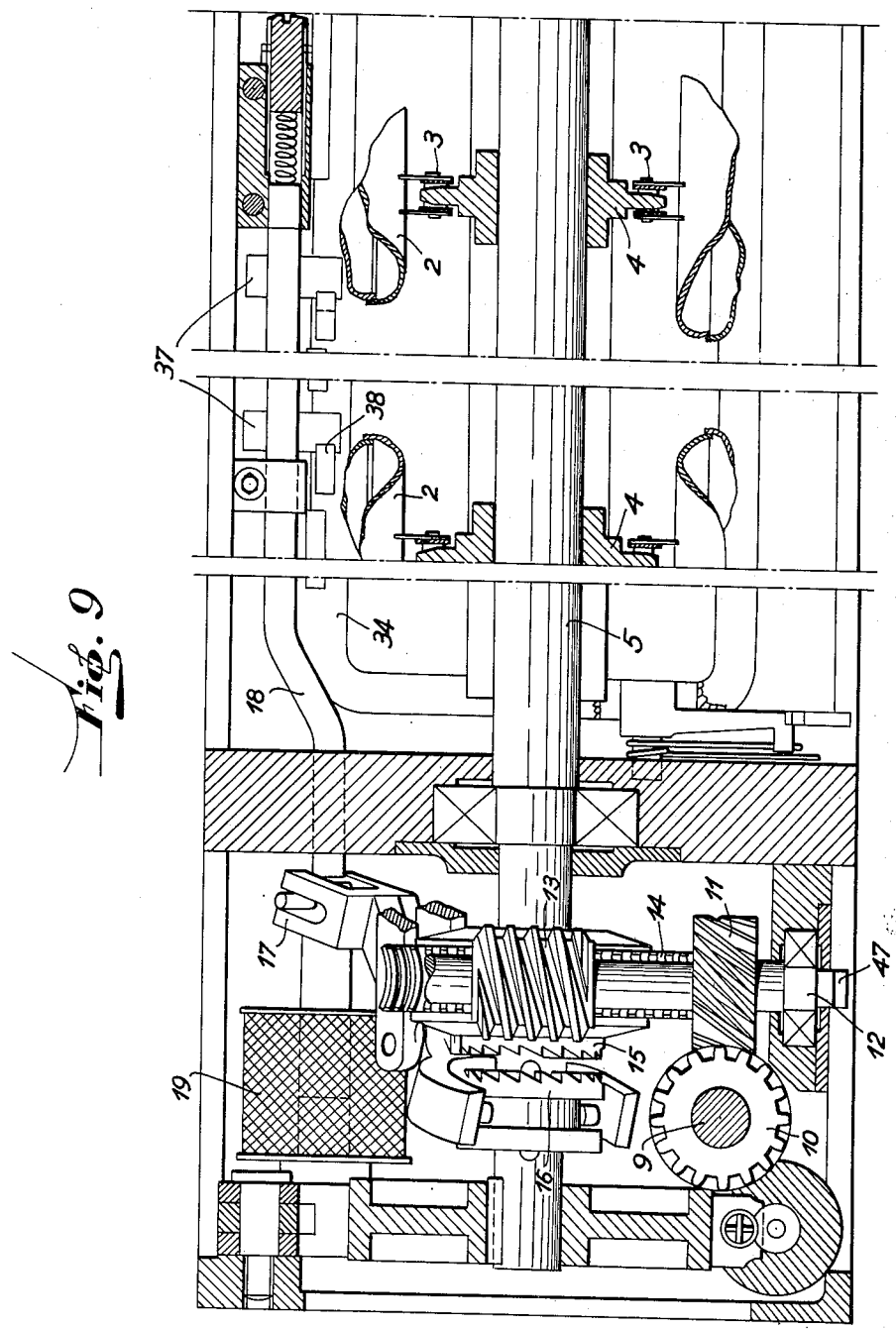
Fig. 9 is a detailed view of the mechanisms actuating the endless chain shaft.

As shown in the illustrative drawings, the filing cabinet of this invention is formed by a cabinet or box 1, housing therein all the mechanisms thereof, The box or cabinet 1 may be quadrangular parellelepiped in shape, as shown in Fig. 1, but it may also have any of the shapes illustrated in Figs. 34 to 43.

Within the cabinet 1 there is provided a plurality of receptacles 2 mounted on one or more endless chains 3 meshing with sprocket wheels 4 mounted upon a pair of parallel shafts 5 and 6 which are freely mounted in bearings provided by the walls of the cabinet 1.

The shaft 5 is connected to driving means which will be described hereinafter, while shaft 6 is freely rotatable and provided with tighteners 7 (Fig. 2) for suitably stretching the endless chain 3.

The power source is constituted by an electric motor 8 the shaft 9 of which carries a pinion 10 (Figs. 2, 9 and 10) permanently meshing with a gear wheel 11 fixed to an auxiliary shaft 12 having an endless screw 13 which meshes with a toothed crown 14 mounted on shaft 5.

Shaft 5 is provided with a clutch formed by a toothed ring 15 fixed to the crown 14; the other half 16 of the clutch is mounted on shaft 5 and is capable of being moved longitudinally so that the toothed portion thereof may mesh with the other half 15. Said meshing is carried out by means of a fork member 17 connected operatively to a stem 18 controlled by an electromagnet 19.

Figure 10:
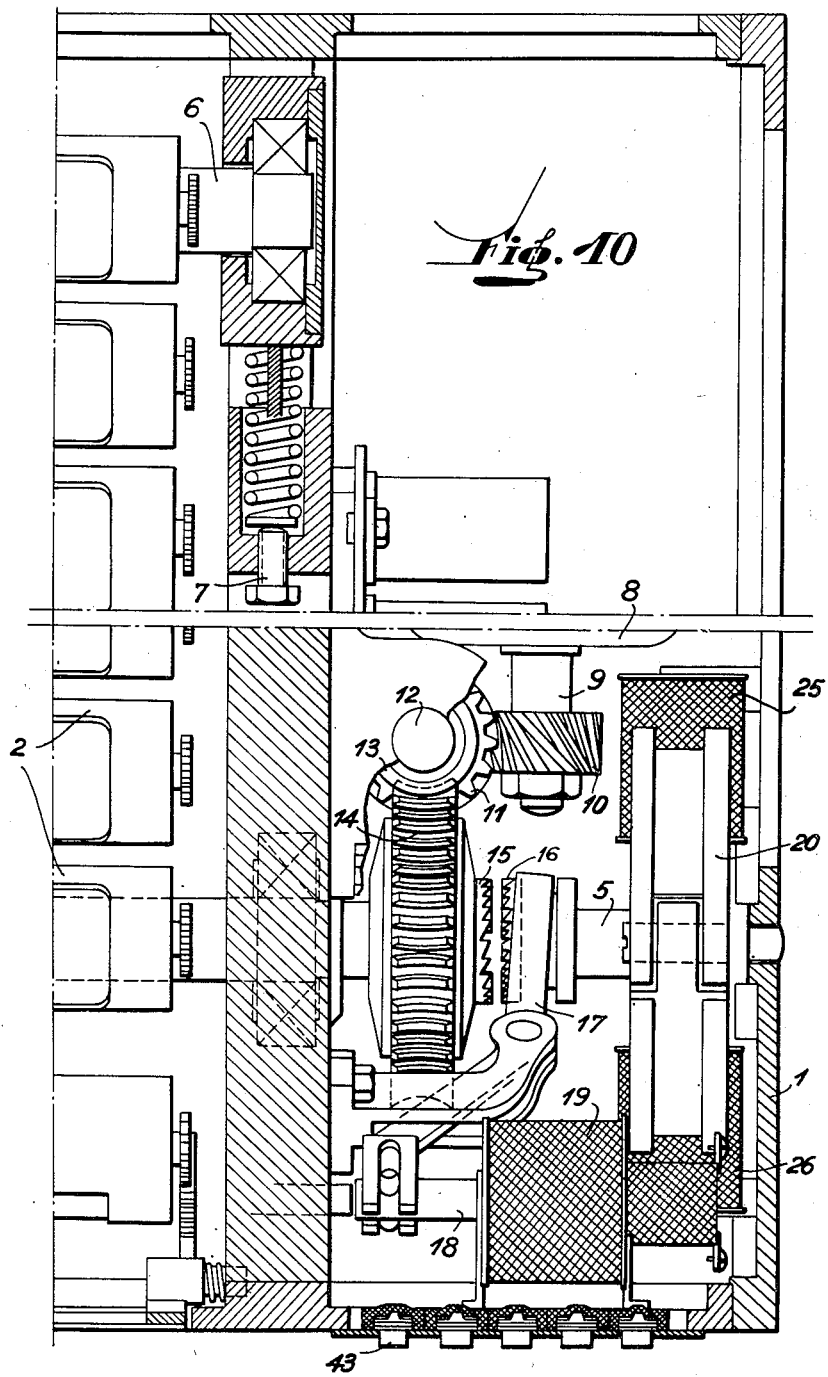
Fig. 10 is a longitudinal sectional view, partly broken away, of the mechanisms illustrated in Fig. 9, clearly showing the brake elements for braking the endless chain driving shaft, the control buttons, the clutch arm support, the brake electromagnets and the clutch and door electromagnet.
Figure 12:
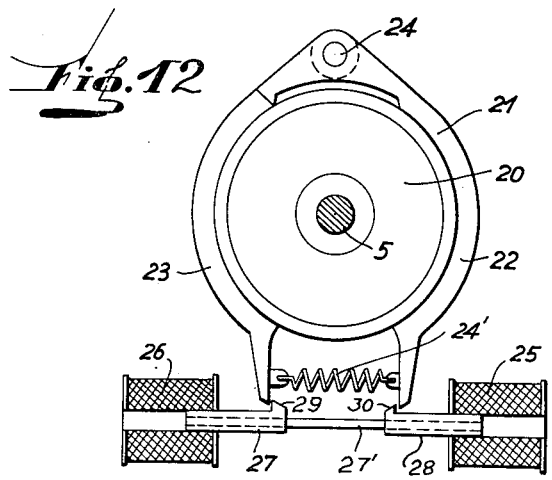
Fig. 12 is a detailed view of the brake mechanism with its corresponding electromagnets.

The shaft 15 also carries a brake mechanism shown clearly in Figs. 10 and 12. This brake mechanism comprises a drum 20, fixed to shaft 5 and capable of being held by a clamp 21 formed by a pair of arms 22 and 23 pivoted by means of a pivot pin 24. Said arms are permanently pressed against the drum 20 by means of a pull spring 24' connecting same by their free ends.

The release of the brakes is obtained by means of a pair of electromagnets 25 and 26 each carrying a rod 27, 28 respectively. The free ends of rods 27 and 28 are provided with claws 29 and 30 which are permanently hooked to the free ends of arms 22 and 23. Rods 27 and 28 are guided by the pin 27'.

The aforesaid electromagnets are arranged so that the rods thereof will move in the same direction but in opposite senses. The attraction of the rods by the electromagnets will result in the opening of the arms with the consequent release of the brake, thereby freeing the shaft 5.

As clearly shown in Figs. 3 and 4, the receptacles 2 are mounted on the endless chain 3 by means of special links 31 fixed to the receptacles.

In accordance with an advantageous form of construction, the receptacles 2 are constituted by cylindrical boxes comprising a portion 32 fixed to the endless chain, and a movable portion 33 acting as a receptacle cover. This is clearly shown in Figs. 4, 5 and 8.

The box or cabinet 1 also has a door 34 for affording access to the receptacles 2. This door 34 is freely rotatable about shafts 35 (Figs. 1, 2, 3, 6, 7 and 9) and is provided with a spring 36 urging same towards the open position thereof.

When in closed position, the door 34 is locked by the rod 18 having two or more claws 37 (Fig. 9) fitting in lock members 38 carried by the door.

When the electromagnet 19 moves the rod 18, the latter will release the claws 37 thereof from the lock member 38 and as the door 34 is released, it will snap open due to the action of the spring 36.

At one end, the door 34 has a toothed sector 39 which functions to open the cover 33 of the receptacle which is moved opposite the access opening of the box or cabinet 1.

As shown in Fig. 5, the covers 33 have a stud 40 extending through the ends 41 of the receptacles 2.

The projecting end of each stud 40 carries a small gear 42 with which the toothed sector 39 is arranged to mesh when the door 34 opens. Said sector will cause the partial rotation of the gear 42, which will result in the opening of the cover 33.

Figure 11:
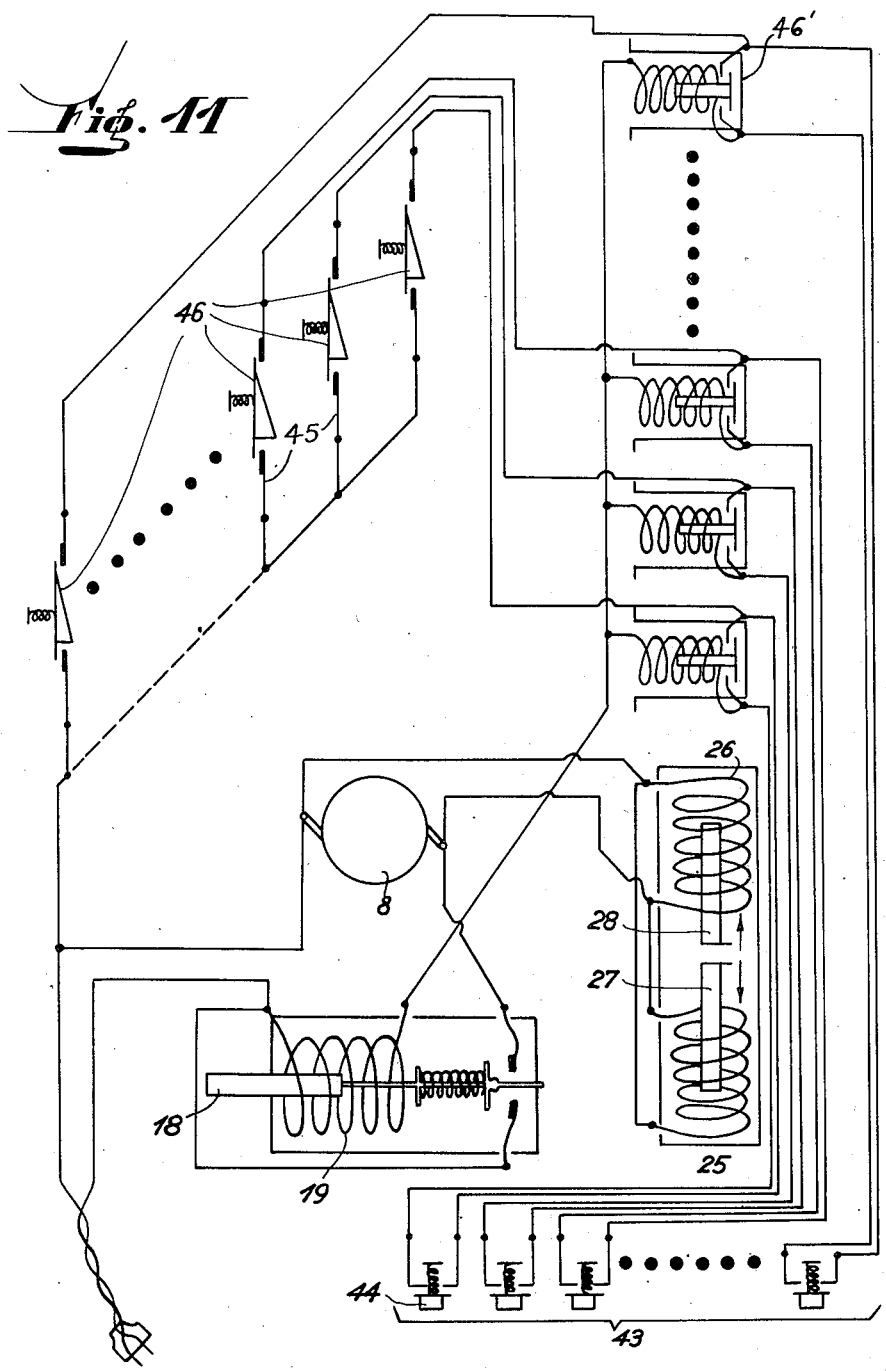
Fig. 11 is a wiring diagram showing the electrical connections to the motor, control buttons, electromagnets, contacts and switches.

All of the operations described above are carried out in a fully timed and automatic manner by means of electric circuits such as those shown in the diagram of Fig. 11. In accordance with same, the operation of the filing cabinet is generally as follows.

Each receptacle has in a control panel 43 (Figs. 2 and 11) a button 44 constituting a switch inserted in the circuit of a given receptacle.

When the switch is depressed, the circuit is closed and operation of the apparatus is initiated. Thus, the motor 8 is energized and simultaneously the electromagnet 19 moves the rod 18 to thereby energize the clutch 15—16. Thus, the shaft 5 is moved and also the endless chain 3 is rotated. This occurs because the electromagnets 25 and 26 attract their respective rods which separates the arms from the clamp 21 so that the shaft 5 can rotate.

After the receptacles assume a position which is opposite the cabinet door, a finger 45 carried by the receptacle 2 raises the switch 46 to break the circuit and prevent further supply of current. Thus, the shaft 5 will stop rotating since the electromagnets 25 and 26 will release the arms 22 and 23.

Figure 13:
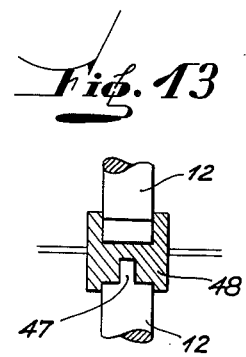
Fig. 13 is a view showing the manner in which the driving shafts of two or more superposed units may be coupled.

The rod 18 simultaneously releases the door 34 so that the sector 39 opens a selected receptacle whereby a person can gain access to such a receptacle. It will be seen, from Figs. 9, 13 and 14, that the end 47 has projections 48 whereby shafts 12 can be coupled together so that a single motor 8 will operate the various units.

By using a safety mechanism, the door 34 will not be torn off the cabinet by the moving parts. Any type of conventional keyboards, switches or operating fingers can be provided for stopping the device at a selected location. The door 34 is unlocked when the rotary movement of the shaft stops and any type of mechanism can be used for accomplishing this.

Obviously, the door 34 is closed before one of the buttons 44 is pressed and the safety mechanism can be simply constituted by mechanism preventing the completion of an electrical circuit when the door 34 is open.

As will be apparent from Fig. 11, depression of one of the buttons 44 completes a circuit to an electromagnetic circuit closer 46' associated with one of the switches 46. When this particular switch is tripped by one of the fingers 45, the circuit closing 46' is opened to shut off the flow of electric current. As can be seen in Fig. 2, the switches 46 are strung out laterally across the box or cabinet 1 and the fingers 45 on the various receptacles 2 are similarly laterally spaced so that only one of the fingers 45 can actuate any particular switch 46.

It follows that contact between a finger 45 and a switch 46 corresponding with the particular button 44 which was depressed will function to stop the device at a location determined by which of the buttons 44 was depressed.

Fig. 15 shows a cabinet of the upright type, the mechanism of which is similar to that explained above, excepting the means for actuating the stop-switches and the means for opening the cabinet door.

Contrary to the embodiment shown in Fig. 3, the switches 46 are located within the circuit limited by the endless chain 3.

In Fig. 16, it may be seen that apart from the finger connecting them to the receptacles 2, the links 31 are each provided with a shoe 49 for the purpose of actuating the button of switch 46.

As regards the opening of the door 34, the difference resides in the fact that in place of the toothed sector there is provided a gear wheel 50 arranged for rotating a set of two associated pinions 51 and 52 so that they will act on the gear 42 on the receptacle cover.

Figs. 18 to 23 show a modified embodiment of the filing cabinet.

Fig. 23 illustrates a suitable way in which the endless chain and the corresponding receptacles carried thereby may be distributed so as to full advantage of the capacity of the cabinet 1.

This embodiment also comprises a novel connection of the chain to receptacles. In effect, the stud 40 on the inner portion 33 (Fig. 20) carries two fingers 53 and 54 to which the links of chain 3 are connected.

The ends of the outer portion 32 is provided with peripheral gears 55 for allowing the rotation and opening thereof.

Figs. 24 to 27 illustrate a filing cabinet similar to those described above, excepting that the receptacles have been substituted by folders.

Fig. 24 is a side view of the modified filing cabinet.

Each of the receptacles or folders 56 is mounted on the links of two separate endless chains 57 and 58 arranged so as to be moved parallelly. The two chains are passed about pinions 59 and 60, respectively, having plates 61 and 62.

Plate 61 is associated with a drive shaft 63, while plate 62 is associated with a free shaft 64.

As shown in Figs. 26 and 27, the receptacles or folders 56 are constituted by two parts, i. e., a fixed part 65 and a movable part 66 mounted on a spring 67 and housed within the fixed part 65.

The connection between the two parts 65 and 66 is obtained by means of a small lever 68 which may be locked by a trigger 69.

The automatic control mechanisms may be similar to those described for the first embodiment.

Figs. 28 to 33 illustrate a circular filing cabinet similar to that described above but mounted on a single shaft 70.

The receptacles or folders 71 are similar to the folders 56, with the exception of some details concerning the closing thereof.

The filing cabinet in accordance with this embodiment is fully enclosed and the case 72 thereof (Figs. 31 and 33) is provided with opening 73 through which the movable parts 74 of folders 71 may be moved out.

A lever 75 is provided with a plate 76 acting as a cover for opening 73 when the folder 71 is in closed position. This is clearly shown in Figs. 30 to 33.

Figs. 34 to 43 show some of the types of cabinets or desks suitable for holding systems such as those described above.

In Fig. 34 there is illustrated a horizontal type of cabinet, showing in dotted lines the distribution of receptacles such as those illustrated in Figs. 1 to 14.

Figure 14:
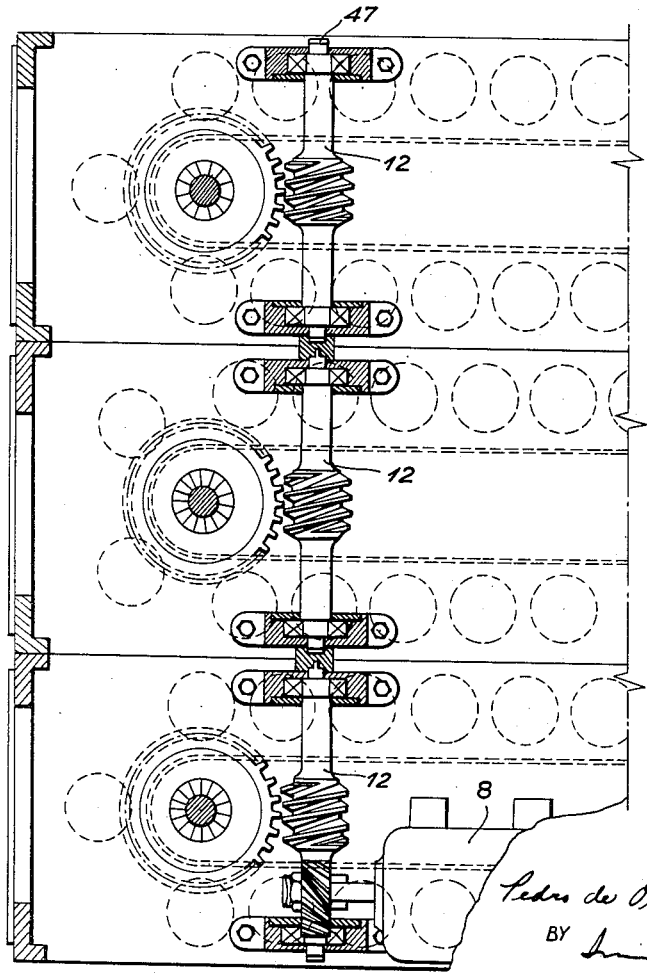
Fig. 14 is a view showing several superposed units.

Fig. 35 is a perspective view of a plurality of superposed horizontal units 1, 1', 1'', 1''', as shown schematically in Fig. 14.

Fig. 36 shows an upright filing cabinet provided with accessories 77 and 78 for facilitating the examination of the filed documents.

Fig. 38 is a view in vertical section of the filing cabinet shown in Fig. 36, so as to show the distribution of the receptacles 2 so as to make full use of the space available.

Fig. 37 is a schematic perspective view of a plurality of aligned upright filing cabinets.

Figs. 39 and 40 are perspective views of desks 79 and 80 converted into filing cabinets of the upright and horizontal type, respectively.

Figs. 41 to 43 refer to cabinets or desks allowing the use of rotary filing systems.

Thus, Fig. 41 is a side view of a cabinet 81 housing therein a circular filing cabinet 82.

Fig. 42 is a schematic perspective view of a cabinet 83 provided with an oval-shaped filing system 84 such as that shown in Fig. 24.

Finally, Fig. 43 shows a desk 85 provided with two circular filing systems 86 at each side.

It is evident that in carrying out this invention, many changes and/or modifications will occur to those skilled in the art, without departing from the scope of the invention as clearly set forth in the appended claims.

We claim:

1. Filing device for keeping documents comprising a housing including a door, locking means for locking and unlocking said door, a pair of shafts mounted for rotation in said housing, pinion means mounted on each of said shafts, endless chain means including links meshing with said pinion means, a plurality of receptacles mounted on said endless chain means for translation thereby in a closed path, each receptacle being substantially cylindrical and including a fixed member secured to selected links, and a movable member including journal means extending through the ends of said fixed member, a gear mounted on one of said journal means, an electrically actuable source of power, an energizing circuit connected to said source of power, a clutch mechanism arranged to couple one of said shafts to said source of power and including a rod means and electrically energizable, actuating means, a brake means for said one shaft including electrical operating means, said energizing circuit including said actuating means, said operating means, start switch means and stop switch means, said rod being operatively associated with said locking means, said door including a toothed sector movable into the path of said gears to actuate said movable member of a selected receptacle in response to movement of said door to open position, and switch actuating means one for each receptacle mounted to move in synchronism therewith, said stop switch means having an actuating member extending into the path of said switch actuating means, whereby actuation of said start switch means causes energization of said source of power, said clutch means and said brake means to permit translation of said receptacles in closed path to pass said door, and actuation of said stop switch means by switch actuating means assigned to a selected receptacle causes deenergization of said source of power, disengagement of said clutch means and application of said brake means.

2. Filing device for keeping documents comprising a housing including a door, locking means for locking and unlocking said door, a pair of shafts mounted for rotation in said housing, pinion means mounted on each of said shafts, endless chain means meshing with said pinion means, a plurality of receptacles mounted on said endless chain means for translation thereby, each of said receptacles comprising a displaceable cover, an electrically actuable source of power comprising an electric motor, an energizing circuit connected to said motor, a transmission mechanism including an endless screw mechanically connected to said motor, a clutch mechanism including a driving member having a worm wheel meshing with said endless screw, and a driven member mounted on one of said shafts, said clutch means also including a rod means and electrically energizable, actuating means, a brake means for said one shaft including electrical operating means, said energizing circuit including said actuating means, said operating means start switch means and stop switch means, said rod being operatively associated with said locking means, said door including cover actuating means movable into the path of a portion of said receptacles to displace the cover of a selected receptacle to open position in response to movement of said door to open position, and switch actuating means one for each receptacle mounted to move in synchronism therewith, said stop switch means having an actuating member extending into the path of said switch actuating means, whereby actuation of said start switch means causes energization of said source of power, said clutch means and said brake means to permit translation of said receptacles in a closed path to pass said door, and actuation of said stop switch means by switch actuating means assigned to a selected receptacle causes deenergization of said source of power, disengagement of said clutch means and application of said brake means.

3. Filing device according to claim 2 including electromagnetic means connected in said circuit and operatively associated with said rod whereby upon energization of said electromagnetic means said rod is actuated to operate said clutch means.

4. Filing device for keeping documents comprising a housing including a door, locking means for locking and unlocking said door, a pair of shafts mounted for rotation in said housing, pinion means mounted on each of said shafts, endless chain means meshing with said pinion means, a plurality of receptacles mounted on said endless chain means for translation thereby, each of said receptacles comprising a displaceable cover, an electrically actuable source of power, an energizing circuit connected to said source of power, a clutch mechanism arranged to couple one of said shafts to said source of power and including a rod means and electrically energizable, actuating means, a brake means for said one shaft including electrical operating means, said energizing circuit including said actuating means, said operating means start switch means and stop switch means, said rod being operatively associated with said locking means, said door including cover actuating means movable into the path of a portion of said receptacles to displace the cover of a selected receptacle to open position in response to movement of said door to open position and a switch actuating finger mounted on each receptacle, said stop switch means having an actuating member extending into the path of said finger, whereby actuation of said start switch means causes energization of said source of power, said clutch means and said brake means to permit translation of said receptacles in a closed path to pass said door, and actuation of said stop switch means by switch actuating means assigned to a selected receptacle causes deenergization of said source of power, disengagement of said clutch means and application of said brake means.

5. Filing device for keeping documents comprising a housing including a door, locking means for locking and unlocking said door, a pair of shafts mounted for rotation in said housing, pinion means mounted on each of said shafts, endless chain means meshing with said pinion means, a plurality of receptacles mounted on said endless chain means for translation thereby, each of said receptacles comprising a displaceable cover, an electrically actuable source of power, an energizing circuit connected to said source of power, a clutch mechanism arranged to couple one of said shafts to said source of power and including a rod means and electrically energizable, actuating means, a brake means for said one shaft including electrical operating means, said energizing circuit including said actuating means, said operating means, start switch means and stop switch means, said rod being operatively associated with said locking means, said door including cover actuating means movable into the path of a portion of said receptacles to displace the cover of a selected receptacle to open position in response to movement of said door to open position and switch actuating fingers mounted on said endless chain means, one finger for each receptacle, said stop switch means having an actuating member extending into the path of said fingers, whereby actuation of said start switch means causes energization of said source of power, said clutch means and said brake means to permit translation of said receptacles in a closed path to pass said door, and actuation of said stop switch means by switch actuating means assigned to a selected receptacle causes deenergization of said source of power, disengagement of said clutch means and application of said brake means.

6. Filing device for keeping documents comprising a housing including a door, locking means for locking and unlocking said door, a pair of shafts mounted for rotation in said housing a first spur wheel, a second spur wheel of differeent diameter fixed to said first spur wheel to form a spur wheel assembly, a pair of spur wheel assemblies mounted in axially spaced relationship on each of said shafts, endless chain means meshing with spur wheels of like diameter, a plurality of folder-like receptacles mounted on said endless chain means for translation thereby, each of said receptacles comprising a displaceable cover, an electrically actuable source of power, an energizing circuit connected to said source of power, a clutch mechanism arranged to couple one of said shafts to said source of power and including a rod means and electrically energizable actuating means, a brake means for said one shaft including electrical operating means, said energizing circuit including said actuating means, said operating means start switch means and stop switch means, said rod being operatively associated with said locking means, said door including cover actuating means movable into the path of a portion of said receptacles to displace the cover of a selected receptacle to open position in response to movement of said door to open position and switch actuating means one for each receptacle mounted to move in synchronism therewith, said stop switch means having an actuating member extending into the path of said switch actuating means, whereby actuation of said start switch means causes energization of said source of power, said clutch means and said brake means to permit translation of said receptacles in a closed path to pass said door, and actuation of said stop switch means by switch actuating means assigned to a selected receptacle causes deenergization of said source of power, disengagement of said clutch means and application of said brake means.

7. Filing device according to claim 6 in which said receptacles comprise each a relatively fixed portion including a bottom wall, and a relatively movable portion, a spring located adjacent said bottom wall, and lever means mounted in said receptacle for releasably securing said movable portion on said fixed portions.

8. Filing device according to claim 6, which comprises a drum shaft, a drum member mounted on said drum shaft and including a side wall, said folder-like receptacles being mounted within said drum member, and a plurality of slots in said side wall for permitting said receptacles to be positioned so as to extend therethrough.

9. In a filing device for documents, a housing, a door movably connected to said housing, locking means for controlling movement of said door, a pair of shafts rotatably mounted in said housing, pinion means mounted on each of said shafts, endless chain means meshing with said pinion means, a plurality of receptacles mounted on said endless chain means for movement thereby, a displaceable cover for each of said receptacles, and electrically actuable source of power, an energizing circuit connected to said source of power, a clutch mechanism for coupling one of said shafts to said source of power and including a rod and electrically energizable actuating means, a brake means for said one shaft including electrical operating means, said energizing circuit including said electrical energizable actuating means, said operating means, starting switch means, and stop switch means, said rod being operatively associated with said locking means, cover actuating means moveable into the path of a portion of said receptacles for displacing the cover of a selected receptacle to open position in response to movement of said door to open position.

10. In a filing device for documents, a housing, a door movably connected to said housing, locking means for controlling movement of said door, a pair of shafts rotatably mounted in said housing, pinion means mounted on each of said shafts, endless chain means meshing with said pinion means, a plurality of receptacles mounted on said endless chain means for movement thereby, a displaceable cover for each of said receptacles, an electrically actuable source of power, an energizing circuit connected to said source of power, a clutch mechanism for coupling one of said shafts to said source of power and including a rod and electrically energizable actuating means, a brake means for said one shaft including electrical operating means, said energizing circuit including said electrical energizable actuating means, said operating means, starting switch means, and stop switch means, said rod being operatively associated with said locking means, cover actuating means moveable into the path of a portion of said receptacles for displacing the cover of a selected receptacle to open position in response to movement of said door to open position switch actuating means for each receptacle adapted to move in synchronism therewith, said stop switch means having an actuating member extending into the path of said switch actuating means whereby actuation of said starting switch means cause energization of said source of power, said clutch means and said brake means to permit translation of said receptacles in a closed path to pass said door, and actuation of said stop switch means by said switch actuating means causes de-energization of said source of power, disengagement of said clutch means, and application of said brake means.

References Cited in the file of this patent

UNITED STATES PATENTS

| | | |
|---|---|---|
| 1,195,291 | Stubbers | Aug. 22, 1916 |
| 2,110,771 | McCauley | Mar. 8, 1938 |
| 2,504,629 | Bertello | Apr. 18, 1950 |
| 2,621,995 | Zenner et al. | Dec. 16, 1952 |